United States Patent
Horie

(10) Patent No.: US 7,079,265 B2
(45) Date of Patent: Jul. 18, 2006

(54) DISTORTION CORRECTION DEVICE FOR CORRECTING IMAGED OBJECT TO PRODUCE PLANE IMAGE WITHOUT DISTORTION

(75) Inventor: Daisaku Horie, Uji (JP)

(73) Assignee: Minolta Co., Ltd., Osaka (JP)

( * ) Notice: Subject to any disclaimer, the term of this patent is extended or adjusted under 35 U.S.C. 154(b) by 877 days.

(21) Appl. No.: 09/941,838

(22) Filed: Aug. 30, 2001

(65) Prior Publication Data

US 2002/0027672 A1    Mar. 7, 2002

(30) Foreign Application Priority Data

Aug. 30, 2000    (JP) .............................. 2000-260360

(51) Int. Cl.
*G06F 15/00* (2006.01)
*G06K 1/00* (2006.01)
*G06K 15/00* (2006.01)

(52) U.S. Cl. .................... 358/1.12; 358/474; 358/486; 358/497; 382/154; 382/274

(58) Field of Classification Search ................ 358/474, 358/1.12, 497, 486; 382/274, 154
See application file for complete search history.

(56) References Cited

U.S. PATENT DOCUMENTS 5,362,958 A    11/1994    Ando
5,652,805 A    7/1997    Ooenoki et al.
5,764,379 A *  6/1998    Matsuda et al. ............. 358/474
5,808,756 A *  9/1998    Matsuda ..................... 358/474
5,995,245 A * 11/1999    Moro ......................... 358/474

FOREIGN PATENT DOCUMENTS

JP    09-102854    4/1997
JP    2000-020682    1/2000

* cited by examiner

*Primary Examiner*—Kimberly Williams
*Assistant Examiner*—Yixing Qin
(74) *Attorney, Agent, or Firm*—McDermott Will & Emery LLP

(57) ABSTRACT

A distortion correction device performs pre-processing on an input image data of a double page spread document or the like and produces an edge image. Upper and lower ends of the document are detected from the produced edge image. From the detected upper and lower ends of the document, a relative position of an imaging unit with respect to the document is detected. An approximate distance from the imaging unit to the document, the relative position of the imaging unit and information about the ends of the document are used to calculate respective heights of points on the document. The input image data then undergoes geometric conversion correction by means of information about the heights. In this way, the distortion correction device can be provided capable of easily and accurately correcting distortion of the image due to nonuniform height of the surface of the object, i.e., document, regardless of imaging conditions.

3 Claims, 18 Drawing Sheets

FIG. 15A
DOCUMENT SURFACE SHAPE = CURVE
FIG. 15B
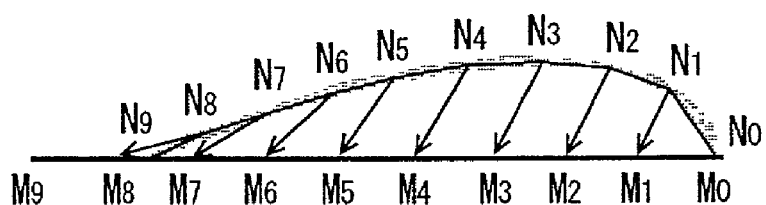
DOCUMENT SURFACE SHAPE = PLANE
FIG. 16
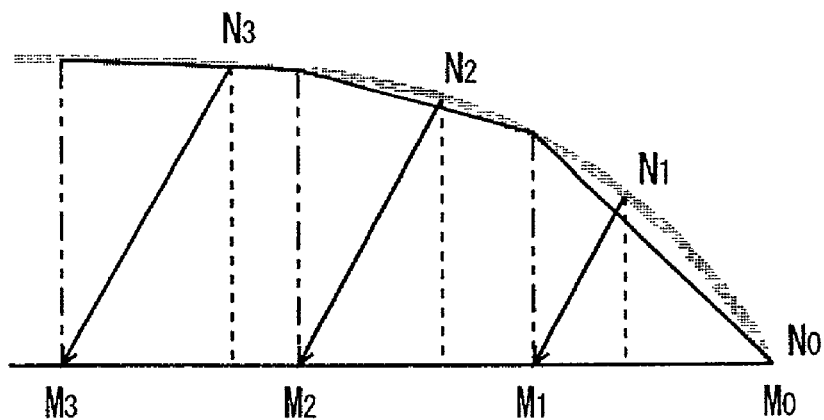

FIG. 17A
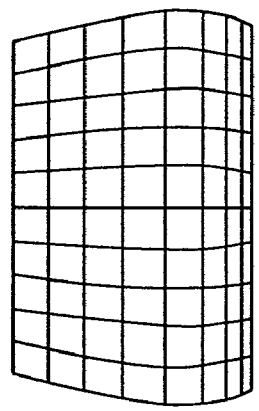
FIG. 17B
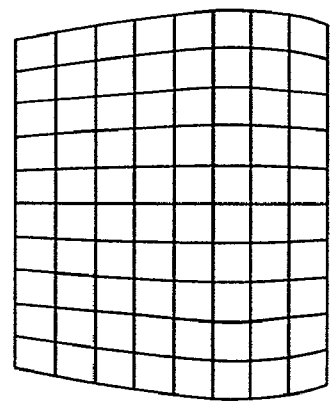
FIG. 17C
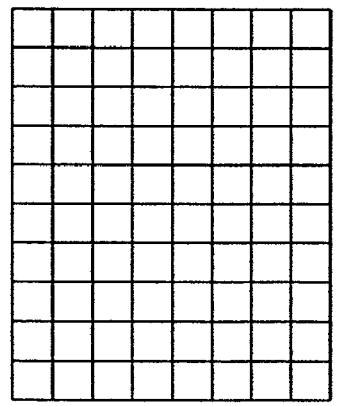

FIG. 18A
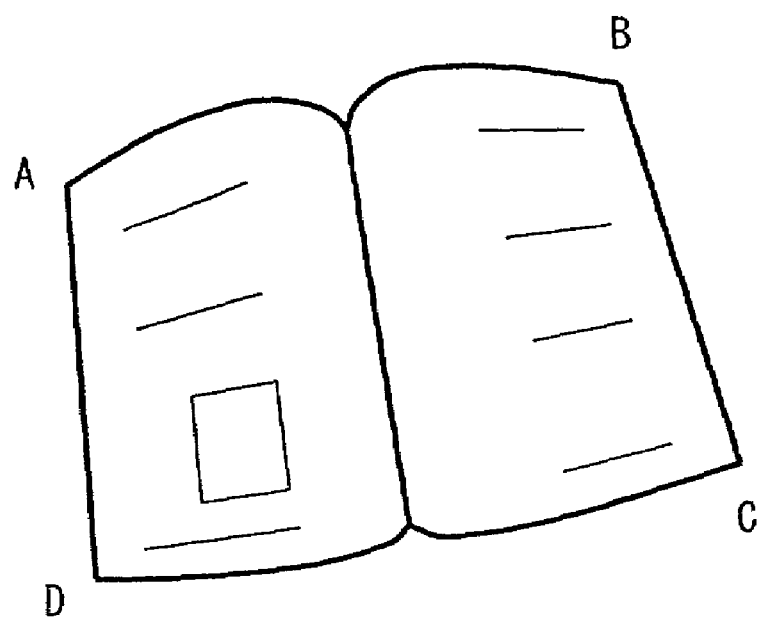
FIG. 18B
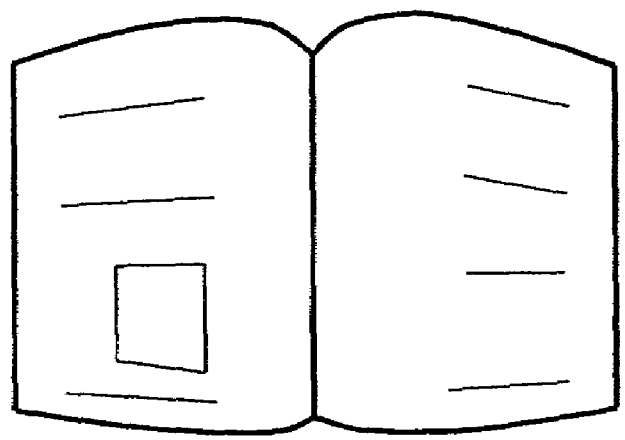

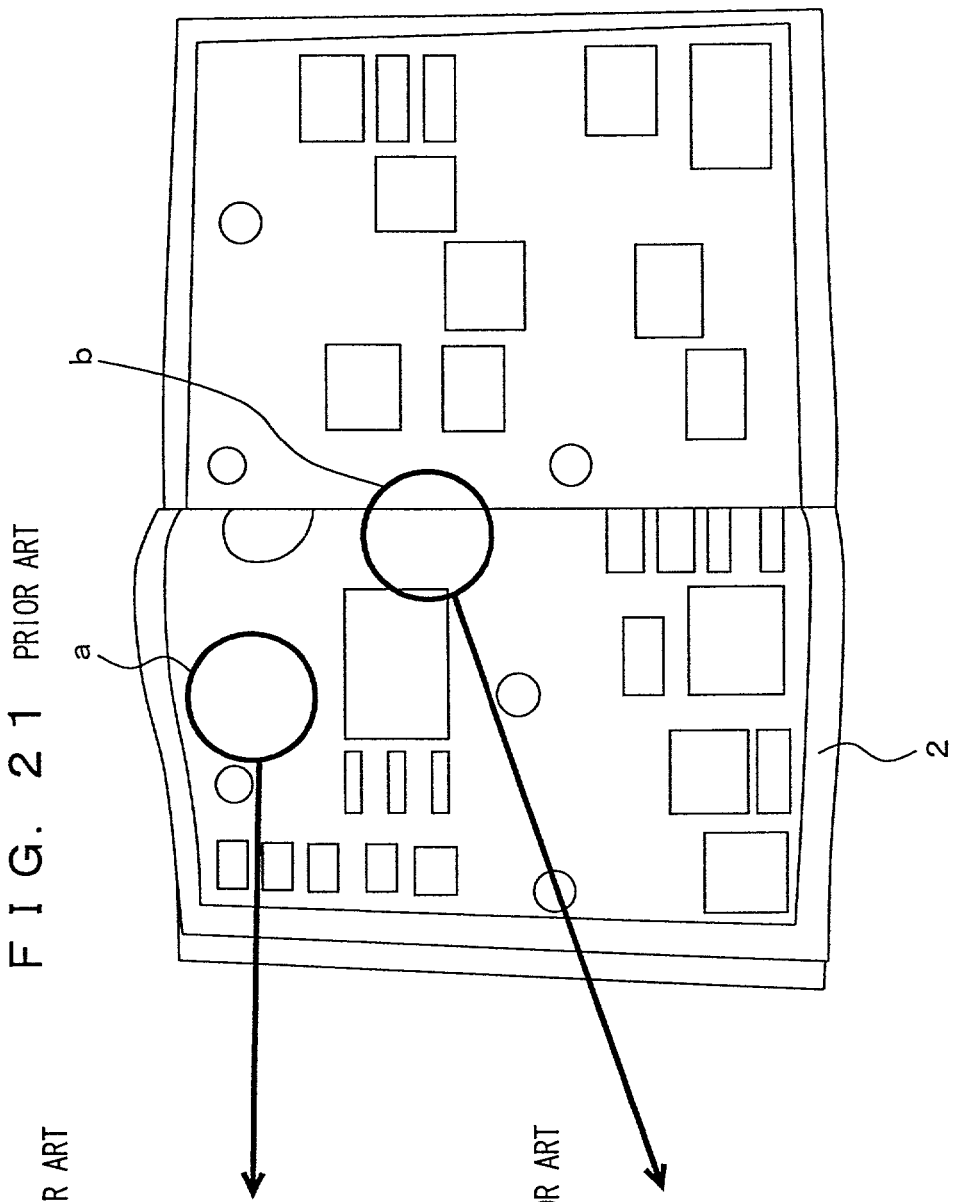

FIG. 23 PRIOR ART
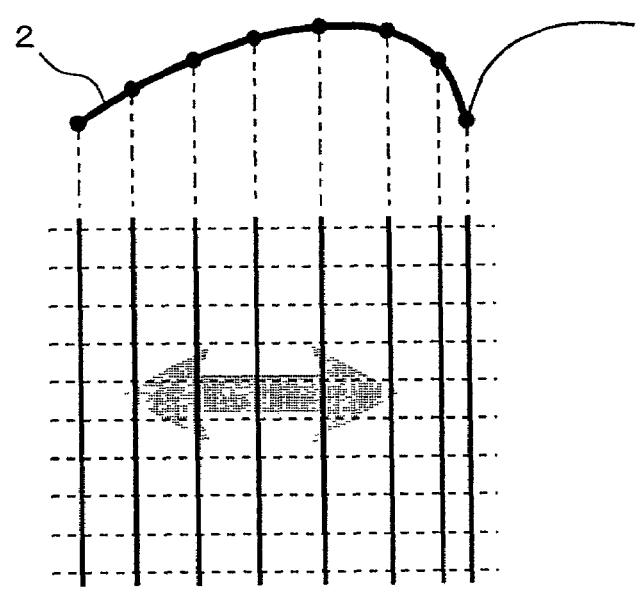
FIG. 24A PRIOR ART    FIG. 24B PRIOR ART
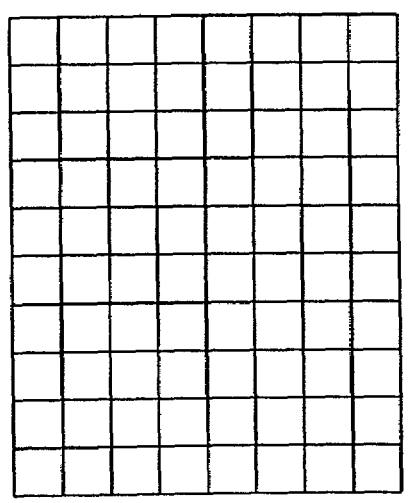  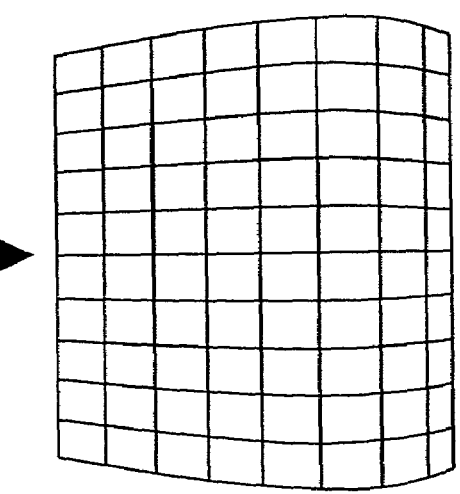

DISTORTION CORRECTION DEVICE FOR CORRECTING IMAGED OBJECT TO PRODUCE PLANE IMAGE WITHOUT DISTORTION

This application is based on application No. 2000-260360 filed in Japan, the content of which is hereby incorporated by reference.

BACKGROUND OF THE INVENTION

1. Field of the Invention

The present invention relates to a device and a method for correcting distortion and a computer-readable recording medium recorded thereon a distortion correction program. In particular, the invention relates to a distortion correction device and a distortion correction method for imaging an original document occupying two facing pages of an opened book or the like to reproduce the document as a plane image thereof, and relates to a computer-readable recording medium recorded thereon a program for operating a computer as a distortion correction device.

2. Description of the Related Art

When an original document on two facing pages of a bound book or the like is imaged from above, a resultant image is distorted due to the nonuniform height from a plate on which the document is placed (hereinafter referred to as "platen") to the surface (to be imaged) of the document. FIGS. 21, 21A and 21B show an exemplary distorted image of an original document on two facing pages of an opened book (the document in this state is hereinafter referred to as "double page spread document") that is imaged from above.

Referring to FIGS. 21, 21A and 21B, the image produced by imaging a double page spread document 2 has distortion of character lines as found in a circled region a (FIG. 21A) where characters are rotated differently depending on positions on the image. Moreover, character size differs depending on positions on the image as shown in a circled region b (FIG. 21B) where characters are further deformed. It is thus difficult to recognize characters from the distorted image. This problem of distortion is found not only in the character region but also in any photo regions and any regions enclosed by ruled lines.

The image distortion is briefly described below in conjunction with FIGS. 22A, 22B and 23 separately for distortions in the vertical and horizontal directions of an image of an original document.

Distortion occurring in the vertical direction is described first with reference to FIG. 22A which schematically shows double page spread document 2 viewed from one side. An imaging unit is positioned at point P1 above nearly the center (point P0) of double page spread document 2. Points A and B are at different heights respectively from the platen and accordingly apart from point P1 of the imaging unit by different vertical distances respectively.

FIG. 22B shows an image of the document having its portions of different sizes depending on horizontal positions on the image.

Different vertical distances from the imaging unit cause image size to vary. Specifically, as shown by solid lines in FIG. 22B, an image portion at a shorter vertical distance has a greater size while an image portion at a longer vertical distance has a smaller size. Then, depending on the position in the horizontal direction of the document, i.e., depending on the height from the platen, image portions have different sizes and thus the image portions differ from each other in terms of resolution.

Horizontal distortion is described next with reference to FIG. 23 which shows expansion and contraction of an original document occurring in the horizontal direction of the document. The document is imaged under the same condition as that shown in FIGS. 22A and 22B, and FIG. 23 also schematically shows double page spread document 2 viewed from one side. The imaged surface of double page spread document 2 is curved. Accordingly, portions on double page spread document 2 at even intervals are converted into image portions at uneven intervals on a plane as shown by FIGS. 24A and 24B. The resultant image thus has expanded and contracted portions in the horizontal direction.

A document which should originally be imaged as a plane image (FIG. 24A) is thus imaged as an image distorted in the horizontal and vertical directions (FIG. 24B).

Various methods have been proposed for correcting such image distortion hereinafter referred to as "book distortion"). For example, U.S. Pat. Nos. 5,362,958 and 5,652,805 disclose techniques of correcting book distortion by using spot light and slit light respectively to detect a surface shape of an original document. Japanese Patent Laying-Open No. 9-102854 discloses a technique of correcting book distortion by using a mirror which is set beside an original document to detect variation of height of the document viewed from the side thereof. Further, Japanese Patent Laying-Open No. 2000-20682 discloses a technique of making corrections by calculating variation in the height direction of an original document according to the state of distortion of an end of the document.

The correction methods as described above have following problems.

Specifically, the technique disclosed in U.S. Pat. No. 5,362,958 requires measurements of numerous positions for enhancing precision in detection of the surface shape of the document, namely precision in detection of height. Moreover, a sufficient amount of spot light must be secured for taking accurate measurements. A resultant problem is thus an increased device size and a longer processing time. In addition, a correction process is required for removing the influence of the spot light from the image in order to produce a final document image. Similarly, the technique disclosed in U.S. Pat. No. 5,652,805 has a problem in terms of the amount of slit light and requirement of correction process for eliminating the influence of the slit light.

The technique shown in Japanese Patent Laying-Open No. 9-102854 has a problem that an imaging unit and an object to be imaged are limited in position because the set mirror is used for detecting the height.

The technique shown in Japanese Patent Laying-Open No. 2000-20682 is intended to be applied to a contact type scanner for a fixed original image and a fixed imaging unit and thus is difficult to be applied to a hand-held type imaging unit or the like for an original document to be imaged and an imaging unit at respective relative positions that are not constant.

Namely, a problem resulting from the inconstant relative positions is that it is impossible to distinguish an end shape of a document having a remarkably varying height, the document viewed from almost directly above, from an end shape of a document having a moderately changing height, the document viewed in an angled direction. Then, variation in the height of the document cannot be specified resulting in an inaccurate correction.

SUMMARY OF THE INVENTION

One object of the present invention is accordingly to provide a distortion correction device, a distortion correction method and a computer-readable recording medium recorded thereon a distortion correction program for easily and accurately correcting distortion of an image produced by imaging a surface of an object, the distortion caused by nonuniform height of the surface, regardless of imaging conditions.

A distortion correction device according to one aspect of the present invention includes: an imaging unit for imaging an object from a point in the direction of height of a surface of the object to generate an image signal representing an image of the surface of the object; an image signal acquiring unit for acquiring the image signal generated by the imaging unit; a detecting unit for detecting a line image from the acquired image signal; a relative position calculating unit for calculating a relative position of the imaging unit with respect to the object according to the line image detected by the detecting unit; a height distribution calculating unit for calculating a height distribution of the surface of the imaged object in the direction of height according to the calculated relative position and the detected line image; and a processing unit for processing the image signal to correct distortion of the image of the object according to the calculated height distribution.

According to the detected line image and information about the relative position of the imaging unit with respect to the object, the height distribution of the surface of the imaged object is calculated. Accordingly, when the position of the imaging unit changes, for example, when a double page spread document having different heights from a plate on which the document is placed is imaged from above by a hand-held type imaging unit, information about a relative position of the imaging unit with respect of the object (document) is acquired to enable accurate calculation of the height distribution to be made according to the acquired information.

On the basis of information about the calculated height distribution, distortion of the image represented by the image signal is thus corrected.

In this way, it is possible to provide the distortion correction device capable of easily and accurately correcting any distortion of an image produced by imaging a surface of an object, the distortion caused by nonuniform height of the surface of the object, regardless of imaging conditions.

Preferably, the line image includes an image of an end of the object, an image of a continuous line or a character string formed on the surface of the object.

The detecting unit detects the image of an end of the object, image of a continuous line or character string formed on the surface of the object and thus image data about appropriate lines on the entire object is obtained. Ruled lines or the like can be detected to obtain line data even if an end of the object, for example, an end of a document, is not included in the produced image.

Preferably, the relative position calculating unit calculates the relative position as a distance in the direction of height between the imaging unit and the surface of the imaged object and a distance in a lateral direction crossing the direction of height between the imaging unit and the surface of the imaged object.

Information about the relative position of the imaging unit with respect to the object includes information about the distance in the direction of height of the object between the imaging unit and the object and information about the distance in the lateral direction therebetween. The positional relation between the imaging unit and the object is thus clarified to make it possible to easily and accurately calculate the height distribution of the surface of the imaged object.

The information about the distance in the direction of height means a length of a perpendicular extended from the imaging unit to the imaged object or information about an approximate distance. The information about the distance in the lateral direction means information about a position of a foot of a perpendicular extended from the imaging unit to the imaged object, for example.

Preferably, the detecting unit detects two line images from the acquired image signal, and the relative position calculating unit calculates the distance in the lateral direction between the imaging unit and the surface of the imaged object according to inclination of the two line images.

The distance in the lateral direction between the imaging unit and the object is calculated according to inclination of the detected two line-shaped regions. As local inclination of the line-shaped regions is used, the lateral distance can be calculated through a simple process.

Still preferably, the distortion correction device further includes an edge detecting unit for detecting an edge of the image and an edge image generating unit for generating an edge image with the detected edge enhanced. The detecting unit refers to the edge image to detect the line image.

The line-shaped regions are detected according to the edge-enhanced image and thus the detecting process can simply and surely be performed.

Still preferably, the image signal acquiring unit includes a pre-processing unit for performing a predetermined pre-processing on the acquired image signal, and the pre-processing unit performs at least one of scaling up/down, sharpness enhancement, white pixel expansion and smoothing.

The edge-enhanced image is produced on the basis of the image data which has undergone a predetermined pre-processing such as scaling up/down. This pre-processing facilitates production of the edge-enhanced image and accordingly the image can be produced more appropriately.

According to another aspect of the invention, a camera includes: an imaging unit for converting an optical image of an object into an electric signal to generate an image signal; and a processor for calculating a positional relation between the imaging unit and the object according to the image signal and correcting the image signal according to the calculated positional relation to represent an image of the object as a plane object.

The camera generates the image signal by converting the optical image of the object into the electric signal, calculates the positional relation between the imaging unit and the object according to the image signal, and corrects the image signal according to the calculated positional relation to represent an image of the object as a plane object. The camera can thus be provided that can easily and accurately make correction to represent an image of the object as a plane object regardless of imaging conditions.

According to still another aspect of the invention, a camera includes: an imaging unit for converting an optical image of an object into an electric signal to generate an image signal; a first calculating unit for calculating respective heights of parts of the object according to the image signal; a second calculating unit for calculating a positional relation between the object and the imaging unit according to the image signal; and a correcting unit for correcting an image of the object represented by the image signal to scale up or down the image according to the respective heights of the parts of the object calculated by the first calculating unit and the positional relation calculated by the second calculating unit.

According to a further aspect of the invention, a method of correcting an image produced by imaging a surface of an opened book facing upward from above of the surface of the book by a camera having a non-fixed positional relation with the book, includes the steps of: imaging the surface of the opened book to generate an electric signal representing the image of the surface of the book; measuring a distance between the camera and the surface of the book; extracting, according to the electric signal, an edge image corresponding to an upper or lower end of the book in the image represented by the electric signal; determining a position of the camera relative to the surface of the book according to the extracted edge image; determining a height distribution of the upper or lower end of the surface of the book according to the measured distance, the extracted edge image of the upper or lower end of the book, and the position of the camera relative to the surface of the book; determining a height distribution of an entire image of the surface of the book on the supposition that the book is at the same height in the direction in which the book is opened; and converting, according to the determined height distributions, the image signal into a signal representing an image of the surface of the book as a plane surface.

According to a further aspect of the invention, a program is provided for executing a method of correcting an image produced by imaging a surface of an opened book facing upward from above of the surface of the book by a camera having a non-fixed positional relation with the book, the method being executed by a computer included in the camera. The method includes the steps of: imaging the surface of the opened book to generate an electric signal representing the image of the surface of the book; measuring a distance between the camera and the surface of the book; extracting, according to the electric signal, an edge image corresponding to an upper or lower end of the book in the image represented by the electric signal; determining a position of the camera relative to the surface of the book according to the extracted edge image; determining a height distribution of the upper or lower end of the surface of the book according to the measured distance, the extracted edge image of the upper or lower end of the book, and the position of the camera relative to the surface of the book; determining a height distribution of an entire image of the surface of the book on the supposition that the book is at the same height in the direction in which the book is opened; and converting, according to the determined height distributions, the image signal into a signal representing an image of the surface of the book as a plane surface.

According to a further aspect of the invention, a program product is used for executing, by a computer, a method of correcting an image produced by imaging a surface of an opened book facing upward from above of the surface of the book by a camera having a non-fixed positional relation with the book, the computer provided separately from the camera. The method includes the steps of: reading an electric signal representing the image of the surface of the book, the electric signal generated by imaging the surface of the opened book; inputting a distance between the camera and the surface of the book; extracting, according to the electric signal, an edge image corresponding to an upper or lower end of the book in the image represented by the electric signal; determining a position of the camera relative to the surface of the book according to the extracted edge image; determining a height distribution of the upper or lower end of the surface of the book according to the measured distance, the extracted edge image of the upper or lower end of the book, and the position of the camera relative to the surface of the book; determining a height distribution of an entire image of the surface of the book on the supposition that the book is at the same height in the direction in which the book is opened; and converting, according to the determined height distributions, the image signal into a signal representing an image of the surface of the book as a plane surface.

The programs each may be recorded on a recording medium.

According to the present invention, a distortion correction program or a computer-readable recording medium on which such a program is recorded can be provided, the program used for executing a distortion correction method, by a computer, for easily and accurately correcting distortion of an image produced by imaging a surface of an object, the distortion caused by nonuniform height of the surface, regardless of imaging conditions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15A and 15B conceptually show geometric deformation in the horizontal direction.

FIG. 16 illustrates conversion of an image through the geometric deformation in detail.

FIGS. 17A to 17C conceptually show correction of book distortion by geometric deformation correction according to height information.

FIGS. 18A and 18B illustrate a process performed when an entire document has skew or deflection.

FIGS. 21, 21A and 21B show one example of a distorted image produced by imaging a double page spread document from above.

FIG. 23 shows an image of a document having expanded and contracted portions in the horizontal direction.

FIGS. 24A and 24B show a plane image produced as an image having distortions in the horizontal and vertical directions respectively.

DESCRIPTION OF THE PREFERRED EMBODIMENTS

Embodiments of the present invention are hereinafter described in detail in conjunction with the drawings.

Figure 1:
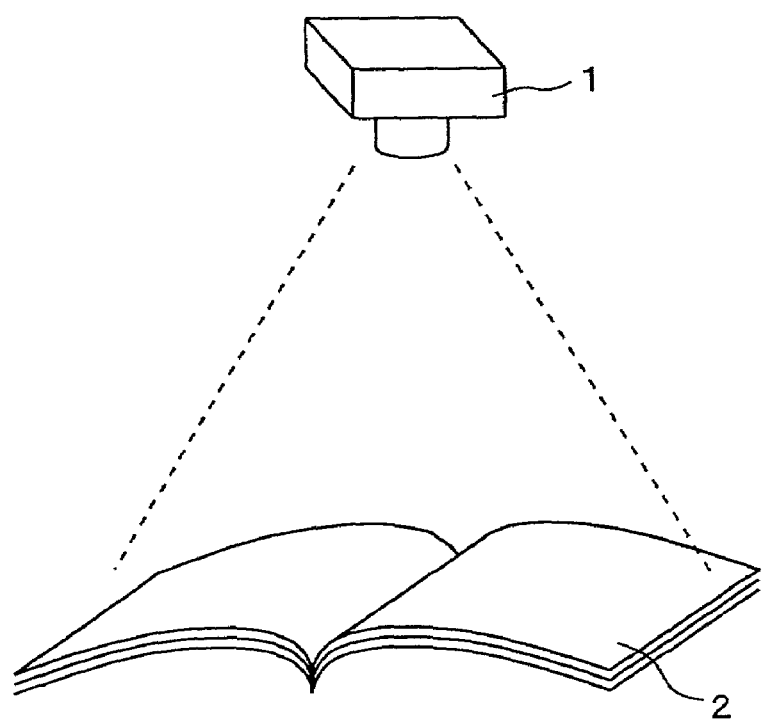
FIG. 1 schematically shows a hand-held imaging unit including a distortion correction device that images a double page spread document according to one embodiment of the present invention.

Referring to FIG. 1, a distortion correction device is provided within a hand-held type imaging unit 1. A double page spread document 2 is imaged from above by imaging unit 1 and the distortion correction device corrects any distortion of a produced image.

Figure 2:
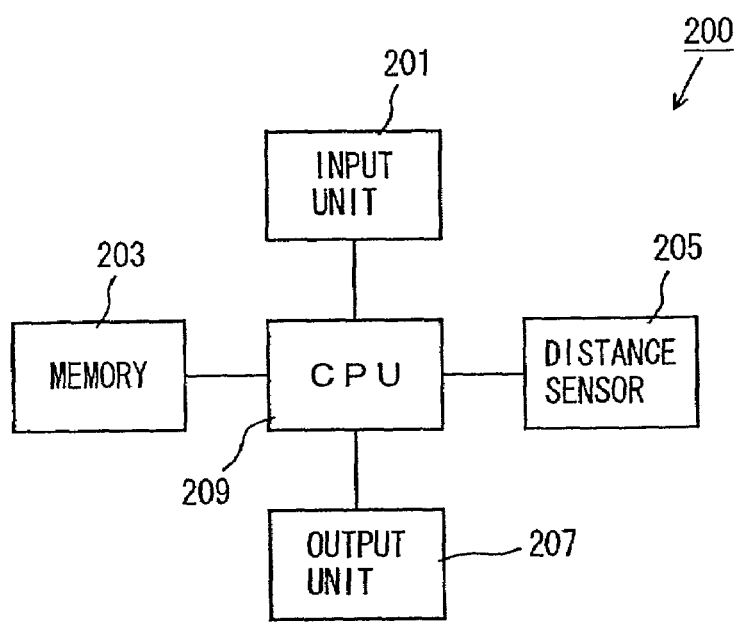
FIG. 2 is a block diagram schematically showing an entire structure of the distortion correction device according to the embodiment of the present invention.

FIG. 2 is a block diagram schematically showing an entire structure of a distortion correction device 200 according to one embodiment of the present invention. Referring to FIG. 2, distortion correction device 200 includes an input unit 201 for entering image data of an original document imaged by imaging unit 1, a memory 203 for storing a distortion correction program to be executed by a CPU 209 and storing the entered image data, processed data and the like, a distance sensor 205 for measuring the distance from imaging unit 1 to a surface of the document to be imaged, an output unit 207 for outputting image data with distortion corrected by CPU 209, and CPU 209 for controlling these units and correcting distortion.

Image data produced by imaging the document by imaging unit 1 is input as digital data to distortion correction device 200 from input unit 201. The input image data is temporarily stored in a predetermined region in memory 203. The stored image data is appropriately read by CPU 209 and then subjected to image processing of various types. At this time, data about an approximate distance from the imaging unit to the document surface is used as required that is measured by distance sensor 205. Final image data having been image-processed is supplied to the outside of distortion correction device 200 from output unit 207.

Figure 3:
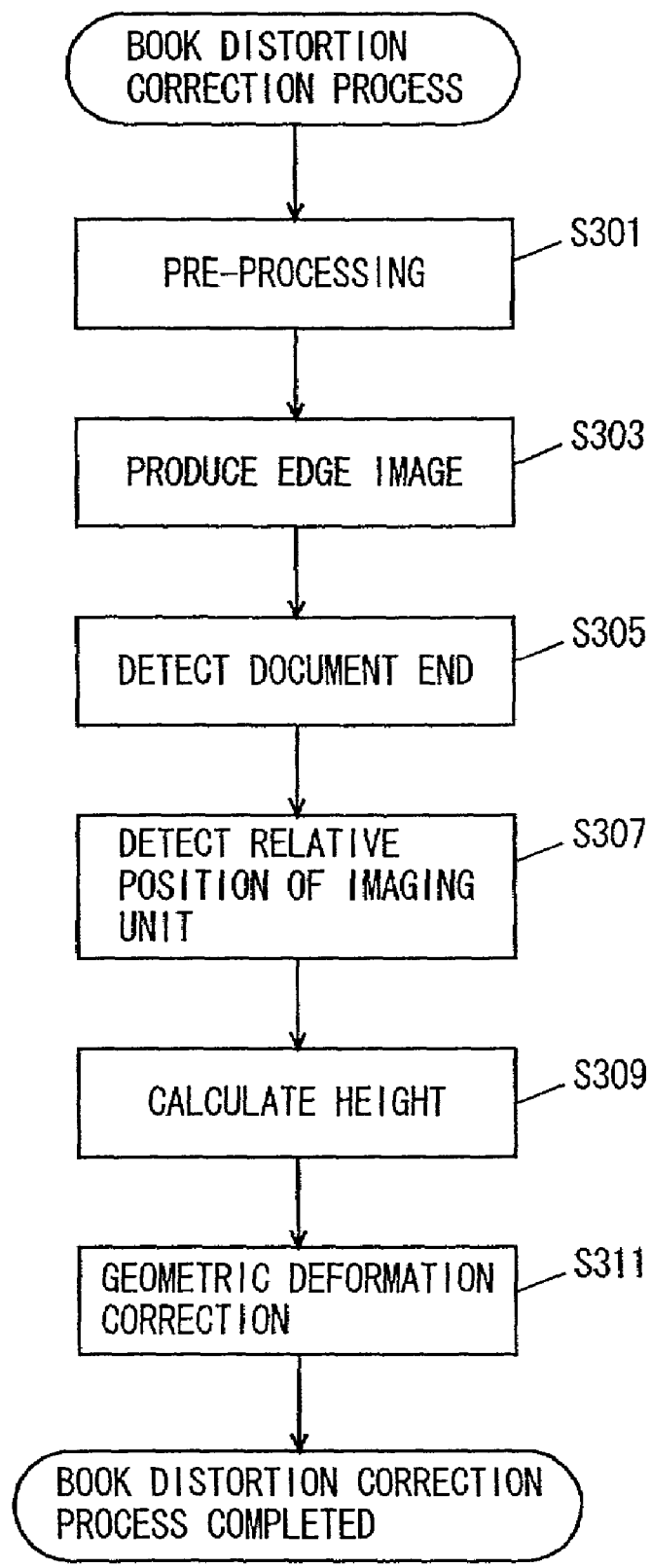
FIG. 3 is a flowchart showing an entire flow of correcting book distortion by the distortion correction device.

A process carried out by distortion correction device 200 is described below in detail. FIG. 3 is a flowchart showing an entire flow of a book distortion correction process by distortion correction device 200. Distortion correction device 200 acquires from distance sensor 205, before carrying out step S301, information about an approximate distance from hand-held imaging unit 1 to a surface of a document to be imaged. Distance sensor 205 may calculate this distance by any method such as contrast method, triangulation, phase-contrast method and the like. If an original document size is known, the approximate distance may be calculated based on a document size in an image.

Book distortion is then corrected. Here, for the purpose of presenting a simple description, it is supposed that the document is laterally opened on two facing pages of a book (double page spread document). It is possible to detect whether the document is opened in the lateral direction or vertical direction (perpendicular to the lateral direction) or rotated, according to a positional relation between the ends or corners of the document. Accordingly, correction can be made similarly on any image by rotating the image or coordinate axis so that the image is in the laterally opened state. A laterally opened document is thus described here.

The approximate distance to the surface of the double page spread document is determined and thereafter image data of the document imaged by imaging unit 1 is pre-processed in step S301. Specifically, the input image data undergoes at least one of scaling down, sharpness enhancement, smoothing and white-pixel expansion processes and the like.

Figure 4:
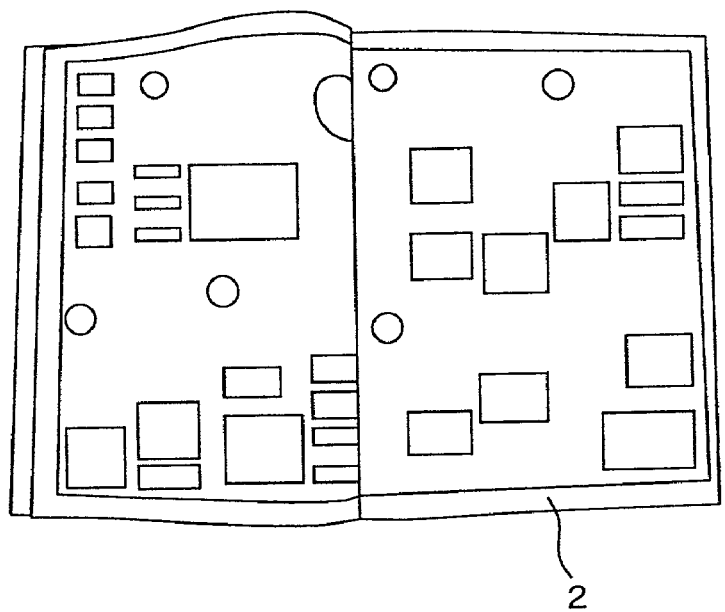
FIG. 4 shows an image of a double page spread document shown in FIG. 21 that has been scaled down and thereafter subjected to sharpness enhancement, white pixel expansion and smoothing successively.

FIG. 4 shows an image produced by scaling down and subsequent sharpness enhancement, white-pixel expansion and smoothing of the image of the double page spread document shown in FIG. 21. This pre-processing makes it possible to ensure a subsequent edge image production.

Figure 5:
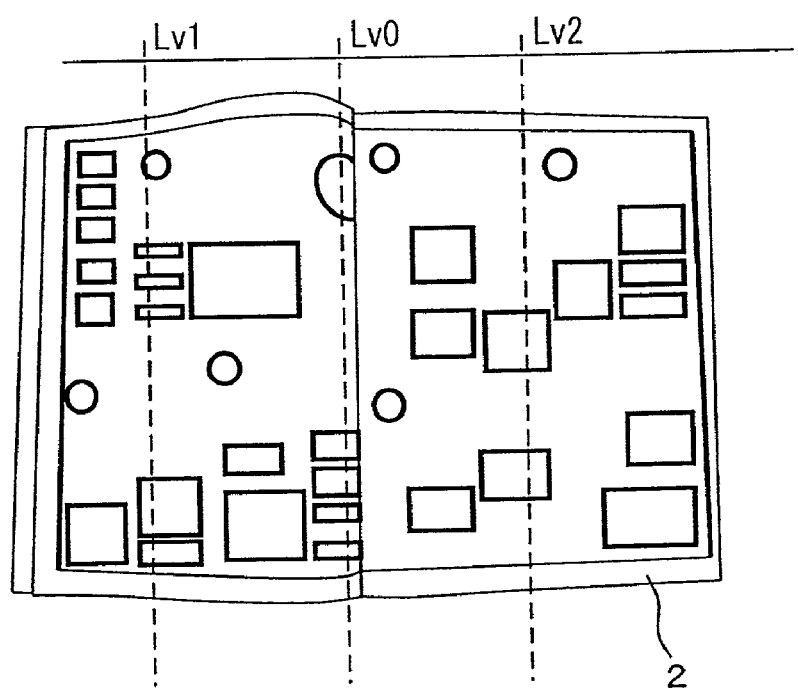
FIG. 5 shows a secondary differential image produced by calculating absolute values of secondary derivatives on the basis of the pre-processed image shown in FIG. 4.

After the pre-processing, an edge image is produced in step S303. Secondary differentiation, for example, is used for producing an edge image. FIG. 5 shows a secondary differential image as an edge image produced by calculating absolute values of secondary derivatives based on the pre-processed image shown in FIG. 4. This edge image production ensures a subsequent document end detection.

After the edge image is produced, document ends are detected in step S305. In this step, both of the upper and lower ends of the document are detected because they are necessary for a subsequent detection of a relative position of imaging unit 1. A method of detecting document ends is detailed later.

After the document end detection, in step S307, a relative position of imaging unit 1 with respect to the document is detected according to information on the detected upper and lower ends of the document. Here, the relative position refers to a position, on an image of the imaged document, of a foot of a perpendicular from imaging unit 1, the perpendicular being an imaginary line extending from imaging unit 1 that is perpendicular to a plane on which the document is placed. Without the information on the relative position and distance between the document and imaging unit 1, accurate information about height cannot be derived from shapes of the detected document ends.

Figure 8A:
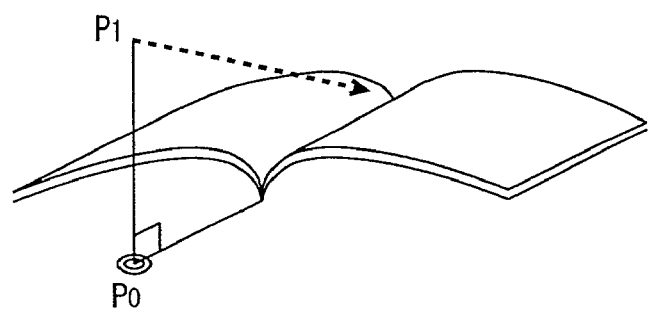
FIGS. 8A and 8B illustrate a shape of an end of a double page spread document of a thin book viewed by an imaging unit at a considerably sharp angle.

FIGS. 8A to 10B show that, when ends of documents of different heights are detected, the detected ends have similar shapes. In these drawings, imaging unit 1 is positioned at point P1 for detecting the upper end of a document and a foot of a perpendicular from imaging unit 1 is located at point P0. FIGS. 8A, 9A and 10A each show a perspective view illustrating a positional relation between imaging unit 1 and a document to be imaged, and FIGS. 8B, 9B and 10B each show a plan view of the document viewed from above.

Figure 8B:
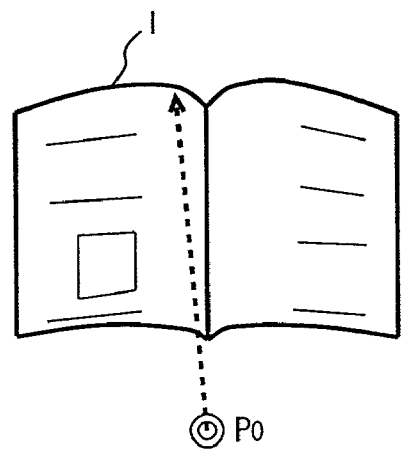
Figure 9A:
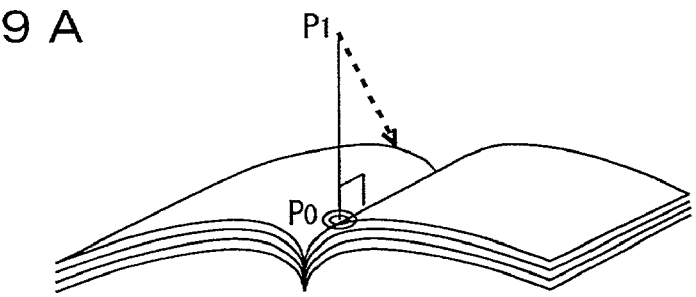
FIGS. 9A and 9B illustrate a shape 1' of an end of a document of a thick book viewed from almost directly above.
Figure 9B:
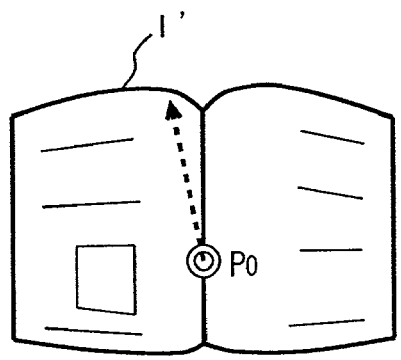
Figure 10A:
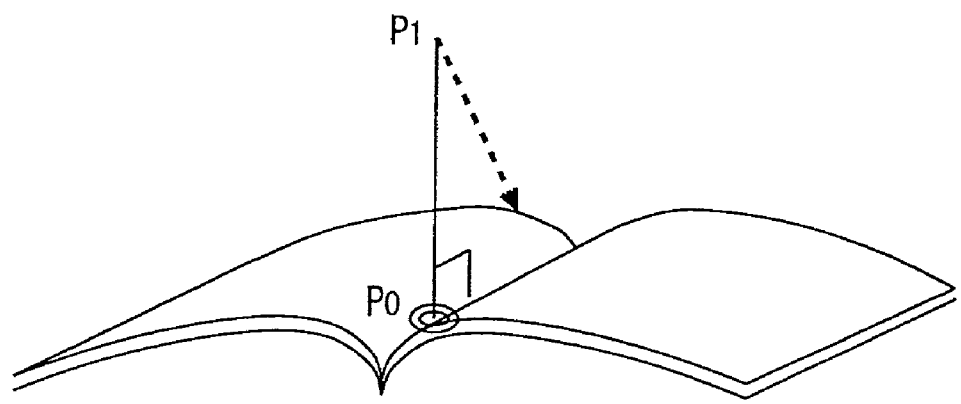
FIGS. 10A and 10B illustrate a shape of an end of a large-size document of a thin book viewed from almost directly above.
Figure 10B:
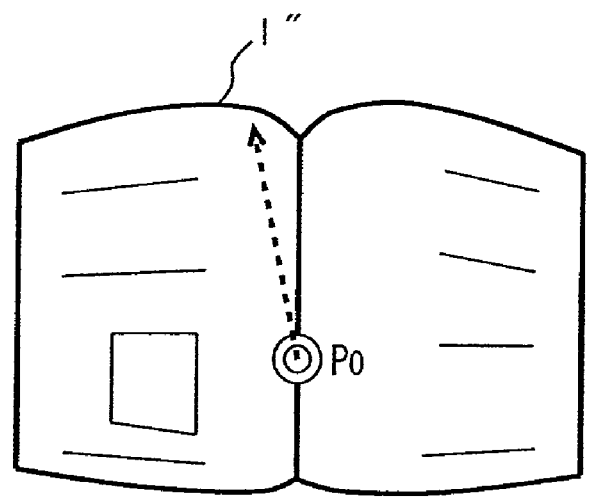

When a double page spread document of a thin book is viewed by imaging unit 1 at a considerably sharp angle, an end of the document has a shape 1 as shown in FIGS. 8A and 8B. When a document of a thick book is viewed from almost directly above, an end of the document has a shape 1' as shown in FIGS. 9A and 9B. When a large-size document of a thin book is viewed from almost directly above, an end of the document has a shape 1" as shown in FIGS. 10A and 10B. These shapes 1, 1' and 1" are similar to each other. Under this situation, difference in height cannot accurately be detected based on the upper ends of the documents if there is no information about the relative position (information about position of point P0).

After the relative position of imaging unit 1 is detected, height is calculated based on the end shape of the document in step S309. Specifically, the approximate distance from imaging unit 1 to the document, the relative position of imaging unit 1 and information about the end shape of the document are used to calculate the height of each point on the document.

It is assumed here that an image of a laterally opened document has less variation of height in the lengthwise direction (direction perpendicular to the lateral direction). Then, only the upper end of the document is used to calculate heights of respective points in the lateral direction.

After height calculation, the document image data undergoes geometric deformation correction using the height information in a final step S311. Specifically, the image produced by imaging the document is geometrically converted in the horizontal direction (direction of x-axis) such that a curved surface is converted into a plane surface. With respect to the vertical direction (direction of y-axis), image portions with respective sizes expanded or contracted and thus different from each other are scaled down or up.

After the geometric deformation correction, the process of correcting book distortion is completed. Through the process as discussed above, distortion of an image occurring when a double page spread document is imaged from above is corrected and thus the document can be reproduced which is recognized as a plane document.

The detection of document ends (S305), detection of a relative position of the imaging unit (S307), height calculation (S309) and geometric deformation correction (S311) in the process of correcting book distortion shown in FIG. 3 are each described in detail below.

Figure 6:
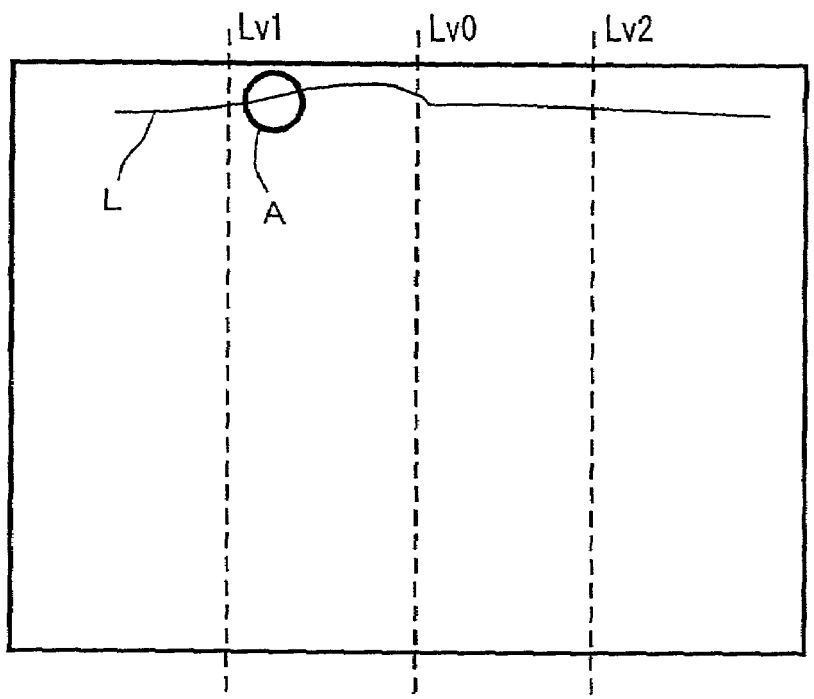
FIG. 6 illustrates detection of a document end.

Detection of document ends (S305) is described in conjunction with FIG. 6. Referring to FIG. 6, the boundary of a rectangle represents the perimeter of an entire input image, curve L represents a detected end of a document, and broken lines Lv, Lv1 and Lv2 are lines dividing the entire input image into four equal parts in the horizontal direction.

Usually, a document image is supposed to be present surely about the center of an input image. Then, the uppermost continuous edge extending over broken lines Lv1 and Lv2 is recognized as the upper end of the document.

Accordingly, the uppermost edge pixel on broken line Lv1 is detected first. Specifically, pixels on broken line Lv1 of the secondary differential image are examined in the order from the top pixel to determine whether the pixel has a value greater than a certain threshold Th1. When any pixel having its value greater than threshold Th1 is detected, the pixel is recognized as the uppermost edge pixel.

Figure 7:
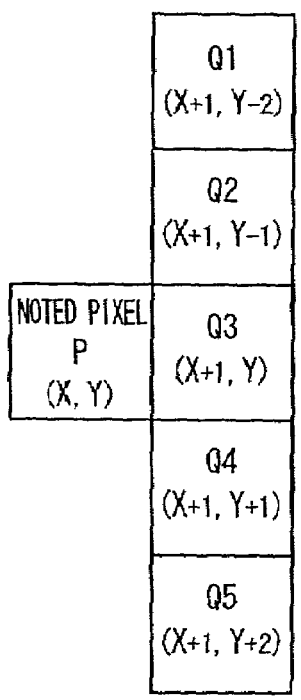
FIG. 7 shows pixels in and around region A in FIG. 6 that is expanded for illustrating detection of edge pixels on the right.

After the edge pixel on Lv1 is detected, edge pixels on the right are detected successively. FIG. 7 is an enlarged view showing pixels in and around region A in FIG. 6 for illustrating detection of an edge pixel on the right. Referring to FIG. 7, "noted pixel P" is a pixel which has already been detected, and a next edge pixel among five pixels (Q1–Q5) on the right of noted pixel P is detected.

First, a pixel which has the largest pixel value of the secondary differential image is selected from the right five pixels. Then, the pixel value of the selected pixel is compared with a threshold Th2 (<Th1) to determine whether the pixel value is greater than threshold Th2. If the pixel value is greater, the selected pixel is recognized as an edge pixel. Then, this recognized edge pixel is designated as a noted pixel to extract an edge pixel from the following five pixels on the right in the same manner. In this way, the edge is tracked successively.

If there is no pixel with its value greater than threshold Th2 before an edge pixel at broken line Lv2 is detected and thus the edge discontinues, it is determined that the detected edge line is not a correct edge and then an edge extraction is newly started. A pixel on broken line Lv1 lower than the previously extracted pixel thereon is selected as an edge pixel to similarly track the edge to the right. This process is appropriately repeated to extract an uppermost continuous edge extending over broken lines Lv1 and Lv2 as the upper end of the document.

After the continuous edge is extracted, the edge is similarly tracked to the left of broken line Lv1 and to the right of broken line Lv2. Ultimately, the upper end of the document is detected on the secondary differential image.

The lower end of the document is similarly detected. Namely, the process shown in FIG. 6 can be applied to detection of the lower end as a symmetrical counterpart of the upper end. The right and left ends are also detected if necessary in the similar manner to that for the upper and lower ends.

The detected upper end of the document corresponds to the upper end of a scaled-down document image and thus the upper end must be correlated with an original image size. Then, information on document end image is reconstituted by any known interpolation method such as linear interpolation and cubic convolution.

Figure 11:
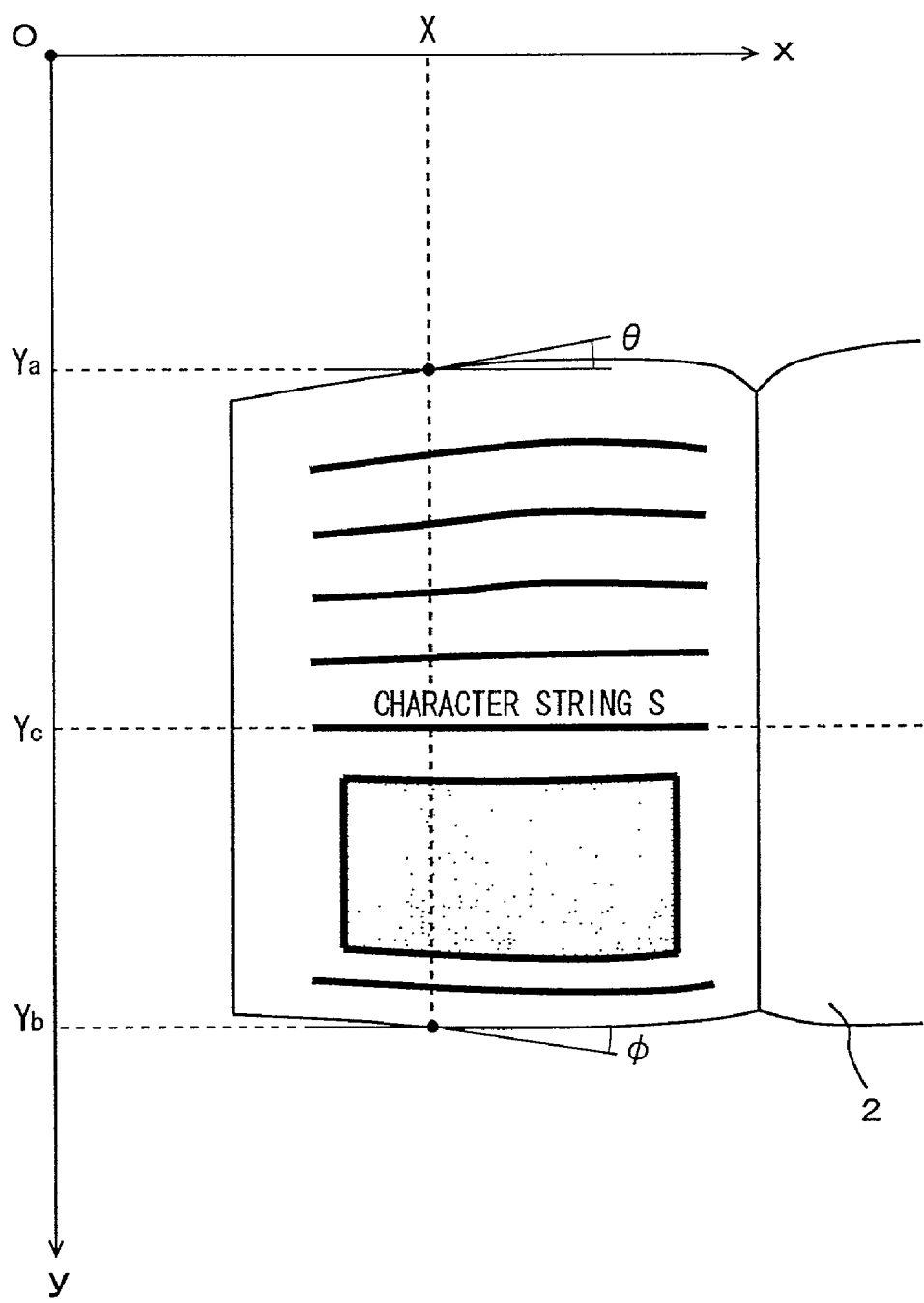
FIG. 11 illustrates a specific process of calculating a relative position from information about document ends.

Detection of a relative position of imaging unit 1 with respect to the document (S307) is described. FIG. 11 illustrates a specific process of calculating the relative position from the information about the document ends. Referring to FIG. 11, x-axis represents horizontal direction and y-axis represents vertical direction. From local inclinations of the document ends, the relative position is calculated.

First an angle of inclination θ at the uppermost point (X, Ya) of imaged double page spread document 2 and an angle of inclination φ at the lowermost point (X, Yb) with the same x coordinate value as that of the uppermost point are determined. If angles θ and φ have the same sign and relation |θ|>|φ| is satisfied, the position of imaging unit 1 in the y direction (relative position coordinate) Yc is determined by Yc=Yb+k×(Yb−Ya)×|φ|. If angles θ and φ have the same sign and relation |θ|≦|φ| is satisfied, the position is determined by Yc=Ya−k×(Yb−Ya)×|φ|. If angles θ and φ have different signs, the position is determined by Yc={(Ya+Yb)/2}+{(Yb−Ya)/2}×(|φ|−|θ|)/(|θ|+|φ|).

Here, coefficient k is a uniquely set value as required depending on an approximate distance between imaging unit 1 and the document, a standard object size (or angle of view in imaging) and the like. In FIG. 11, the relative position of imaging unit 1 is at a y-coordinate position indicated by a character string S. It is noted that the angle of inclination is positive in the counterclockwise direction and thus angle θ is positive while angle φ is negative in FIG. 11.

Instead of local inclinations of the ends of the document used for calculating the relative position, inclinations of character strings, rectangles, lines or the like within the document may be used to similarly calculate the relative position. This is because the ends of a document are not necessarily in the produced image of the document. The inclination angles are extracted by a known method, for example, the inclination angles are measured after expansion of black pixels by scaling down of the image, expansion of black pixels, smoothing and the like.

Figure 12:
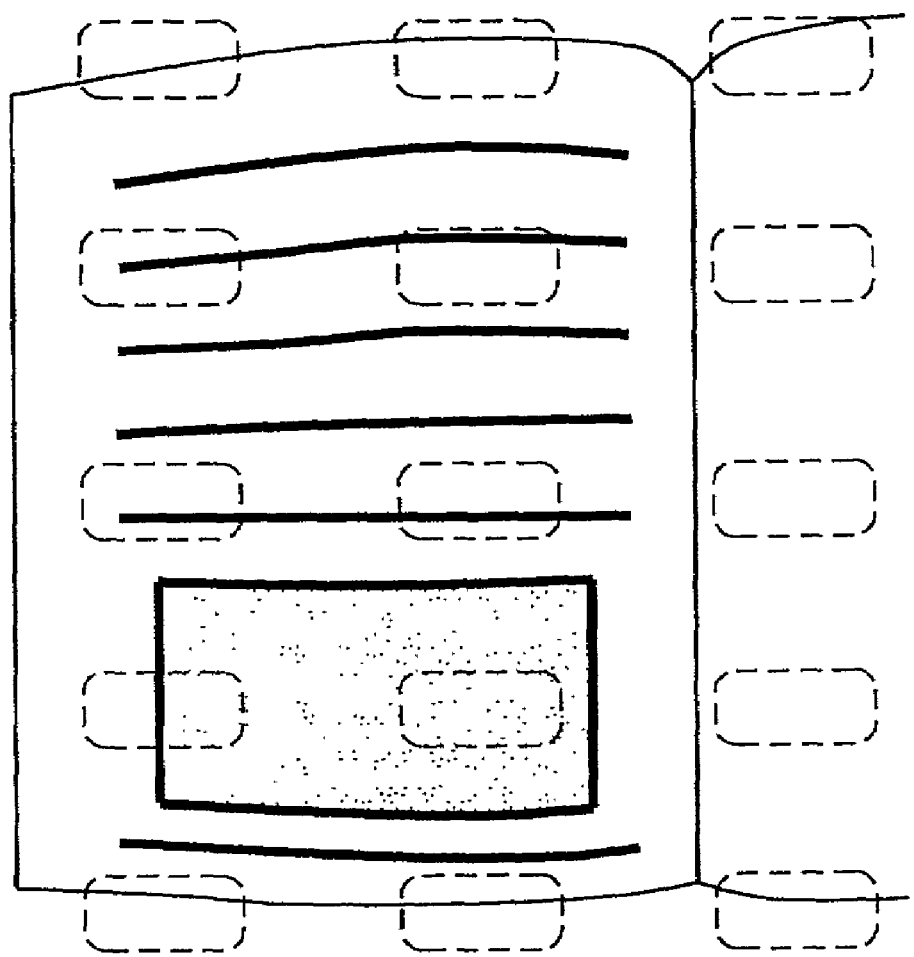
FIG. 12 illustrates calculation of a relative position of an imaging unit according to a plurality of angles of inclination.

When no inclination of a document end, character string or the like is extracted and thus the angle of inclination is zero in the corresponding local region, the position of the region with zero-inclination may be determined as the relative position. For example, in FIG. 11, the region including character string S with angle of inclination of zero is determined as the relative position. The relative position of imaging unit 1 may be calculated from determined inclination angles of a plurality of regions as shown in FIG. 12 indicated by the regions enclosed by dotted lines respectively, in order to enhance the accuracy of the relative position.

Figure 13:
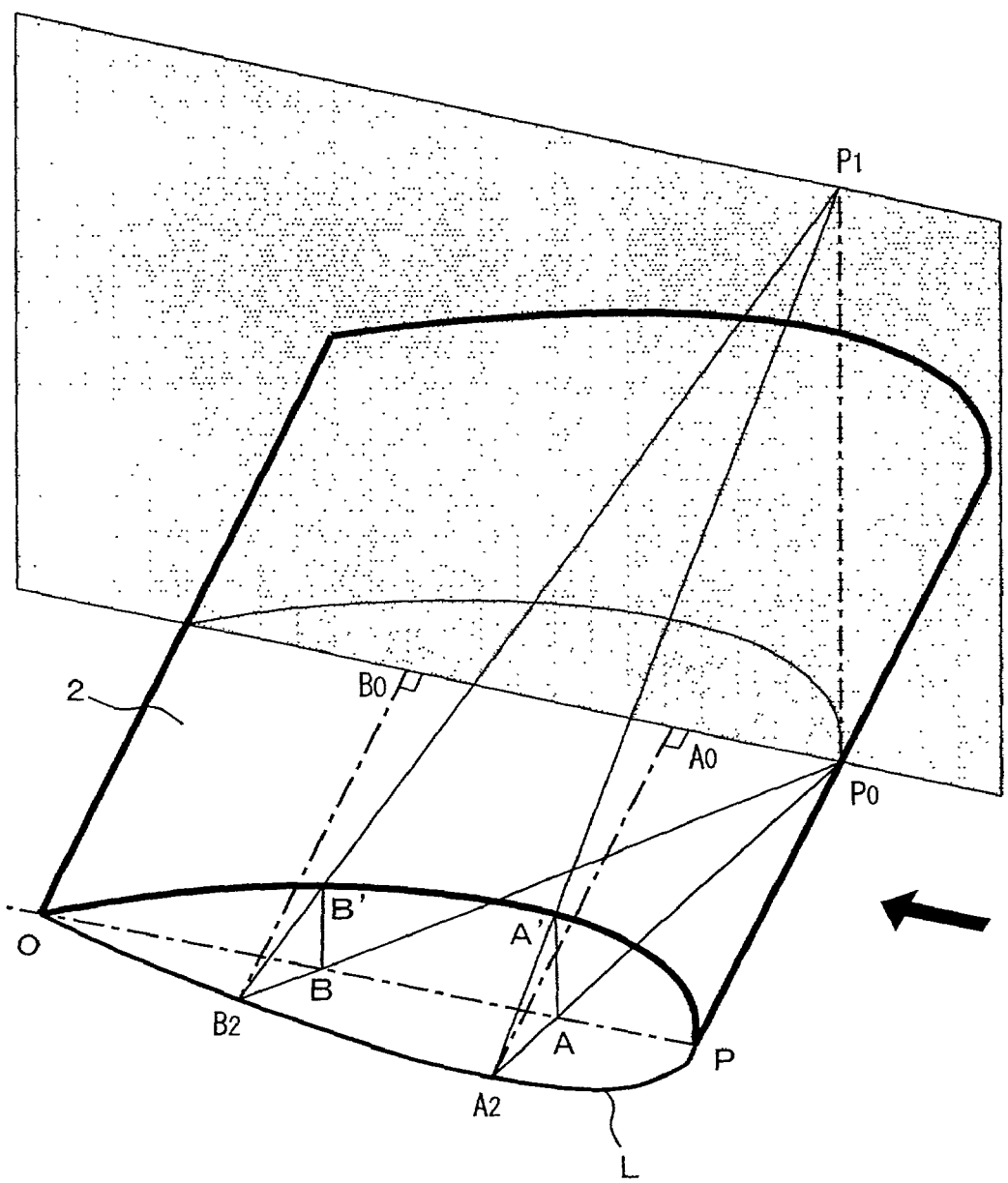
FIG. 13 is a perspective view showing a positional relation between an end L of an imaged document and an imaging unit 1.
Figure 14:
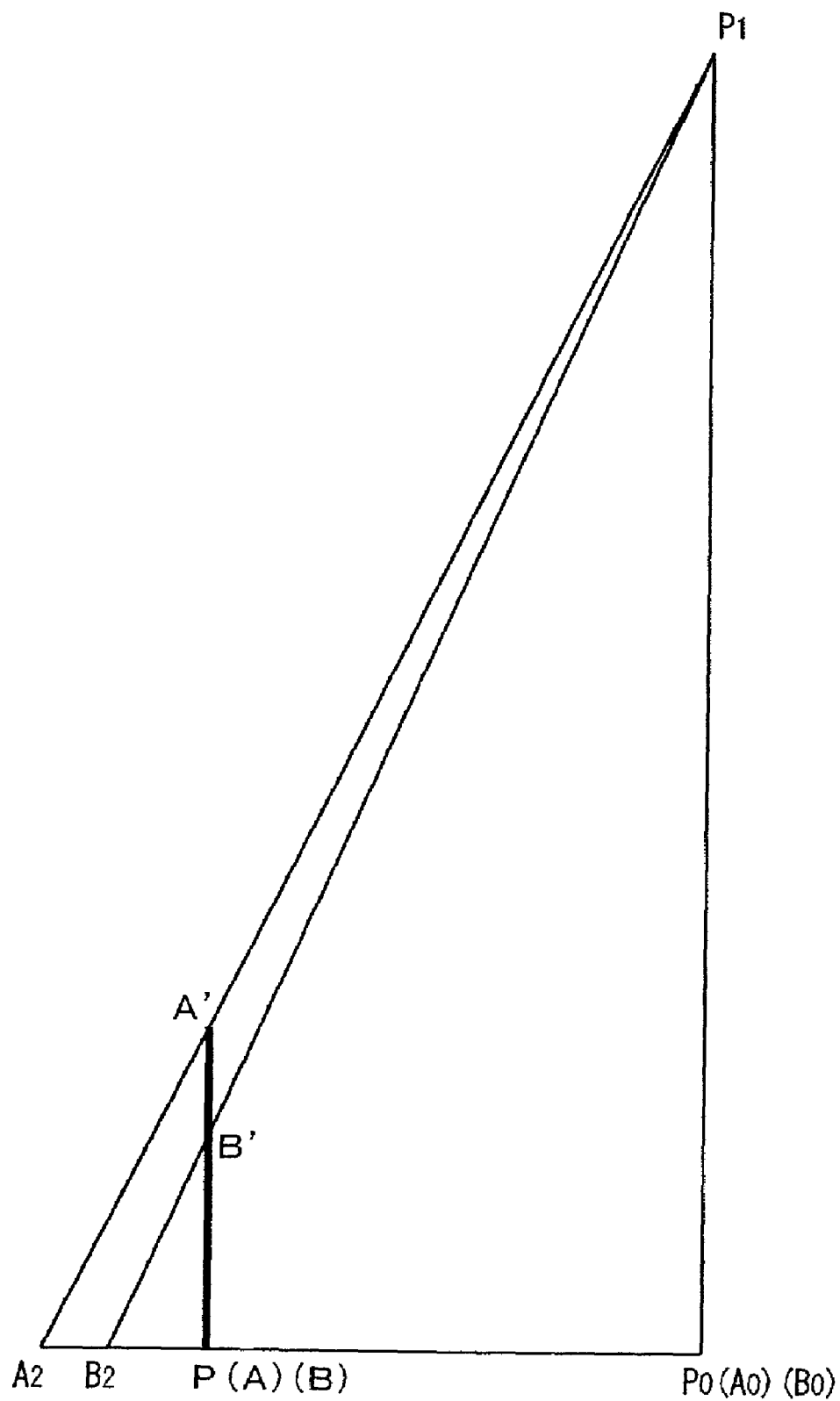
FIG. 14 illustrates the positional relation viewed in the direction of the arrow shown in FIG. 13.

Calculation of height is described below in conjunction with FIGS. 13 and 14. FIG. 13 is a perspective view showing a positional relation between an imaged document end L and imaging unit 1. FIG. 14 shows a positional relation therebetween viewed in the direction indicated by the arrow in FIG. 13.

Referring to FIGS. 13 and 14, point P1 represents a position of imaging unit 1, point P0 represents a foot of a perpendicular extending from P1 to a plane on which the document is placed, point A' represents the highest position on a document end, point B' represents an arbitrary position on the document end, and curve L represents a shape of the imaged document end.

The height of point A' can be calculated by utilizing similarity of triangles in accordance with A'A=P1P0·A2A/A2P0. Similarly, the height of point B' can be calculated in accordance with B'B=P1P0·B2B/B2P0.

P1P0 indicates an approximate distance from imaging unit 1 to the document. P0P is determined as a relative position of imaging unit 1 with respect to the document. Accordingly, A2P0 and B2P0 can be determined from P0P and respective coordinate values.

Geometric deformation correction (step S311) by means of the height information is described now. FIGS. 15A and 15B conceptually illustrate geometric deformation in the horizontal direction. FIG. 15A shows a shape of the document surface before deformation and FIG. 15B shows a shape of the document surface after deformation. Referring to FIGS. 15A and 15B, the document image is geometrically deformed by dividing the document surface after deformation into equal parts at lattice points M0, M1, M2 . . . (M0–M9) in this order and determining respective corresponding positions on the surface before deformation.

The image is thus converted through the geometric deformation as more detailed below in conjunction with FIG. 16. Referring to FIG. 16, image data before deformation that should be at lattice point M1 after deformation is the data at position N1 which satisfies the relation M0M1=N0N1 on a document end. Point N1 is determined from inclination about N0N1 (M0=N0). The inclination about N0N1 may be determined, from the height information, by calculating inclination on a curve of a position corresponding to any position near N1.

After point N1 is determined, position N2 is similarly determined that satisfies the relation M1M2=N1N2. Data at point N2 is converted to lattice point M2 on the plane. Similarly, position N3 is determined that satisfies the relation M2M3=N2N3 and data at point N3 is converted to point M3. This process is repeated to accomplish geometric deformation in the horizontal direction.

FIGS. 17A to 17C conceptually illustrate correction of book distortion through the geometric deformation correction on the basis of the height information. Referring to FIGS. 17A to 17C, a distorted image as shown in FIG. 17A is geometrically converted in the horizontal direction into a horizontally expanded image as shown in FIG. 17B that has a uniform resolution.

Then, the horizontally corrected image shown in FIG. 17B undergoes scaling up/down in the vertical direction into a final plane image with its vertical size variation corrected as shown in FIG. 17C.

The scaling up/down in the vertical direction is done by means of the height information calculated from the shape of the document end and an imaging distance (approximate distance) of imaging unit 1. The image has different vertical sizes depending on horizontal positions as illustrated in FIG. 21 due to different distances from the document to the imaging unit. Then, in accordance with the height information and approximate distance, the distance from each point on the document to the imaging unit can be determined and the determined distance can be used for scaling up/down in the vertical direction. For example, the geometric conversion is made line by line in the vertical direction on the basis of the highest or lowest position on the document for example.

Although FIGS. 17A to 17C show that the horizontal geometric conversion and the vertical scaling up/down are carried out in this order, the conversion may be done in the inverse order. Further, in order to achieve fast processing, coordinate calculation only may be made in advance and thereafter horizontal and vertical conversions may be carried out all together.

The discussion above has been presented on the assumption that the imaged double page spread document has no skew or deflection. A process carried out when an entire image has skew or deflection is described below in conjunction with FIGS. 18A to 19.

As shown in FIG. 18A, when a double page spread document exhibits skew or deflection, corner points A to D are determined according to results of the document end detection (S305) in FIG. 3. The corner points are corrected in advance as shown in FIG. 18B. Subsequent steps S307, S309 and S311 in FIG. 3 are carried out accordingly.

If a positional relation in terms of space between the double page spread document and imaging unit 1 is known, the positional relation may be used to correct skew or deflection. In this case, image data with deflection or the like which has already been corrected may be used to correct book distortion thereof shown in FIG. 3 (steps S301–S311).

Figure 19:
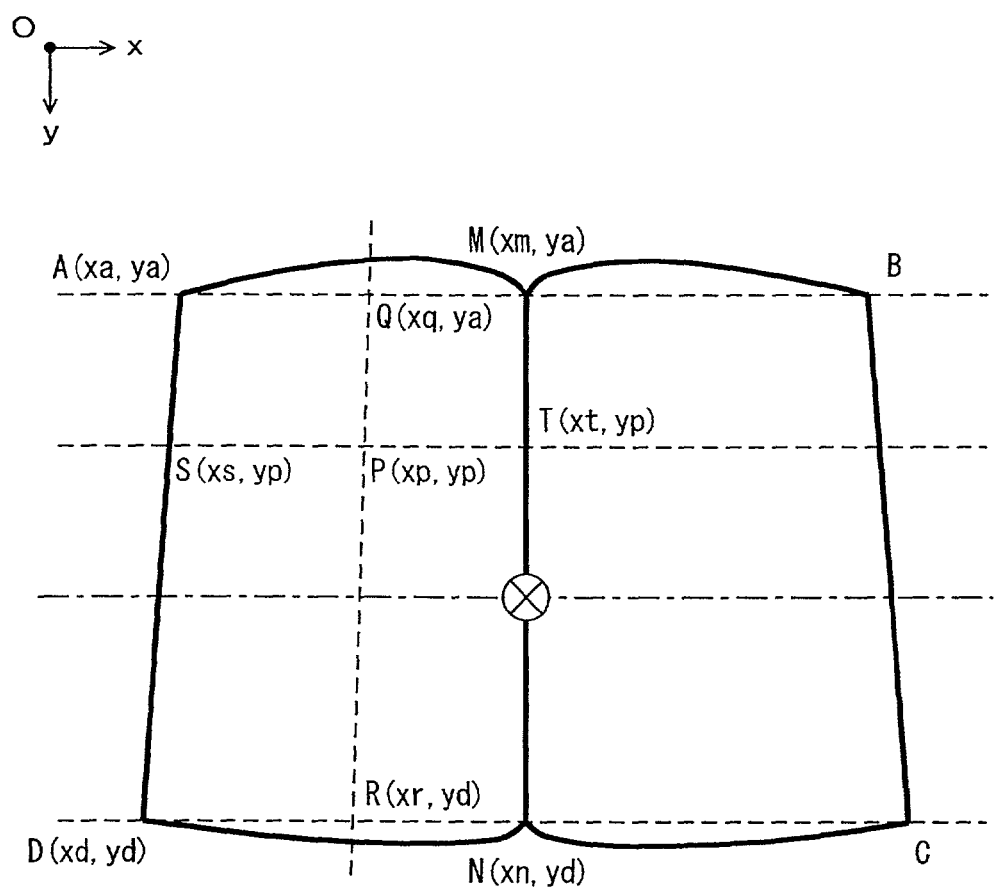
FIG. 19 illustrates a method of calculating height information from a produced image of a document which has its upper and lower ends with different height variations due to waviness or deflection of the document.

FIG. 19 illustrates a method of calculating height from an image produced by imaging a document which has its upper and lower ends with different height variations due to waviness or deflection of the document. Here, straight lines AM, ST and DN are (horizontal) lines in parallel with x-axis. Straight line QR corresponds to a vertical line on the document. Line QR is not in parallel with y-axis on the image of the document due to deflection.

Referring to FIG. 19, height of an arbitrary point on line AM (y=ya) is calculated from the shape of the upper end of the document by the above-described method. Similarly, height of an arbitrary point on line DN (y=yd) is calculated from the shape of the lower end of the document. Then, height information Hq of point Q on line AM and height information Hr of point R on line DN can be calculated if respective x-coordinate values xq and xr are known:

$$xq=\{(xm-xa)(xp-xs)/(xt-xs)\}+xa$$

$$xr=\{(xn-xd)(xp-xs)/(xt-xs)\}+xd$$

where $x_i$ ($i=a, d, m, n, p, t$) is a value of an x coordinate at point i. Xq and xr can thus be used to calculate height information Hp of an arbitrary point P on line ST by means of the following equation:

$$Hp=\{(yd-yp)Hq+(yp-ya)Hr\}/(yd-ya).$$

Height of an arbitrary point on the document is accordingly calculated by using respective distances from the upper and lower ends of the document and height information of the upper and lower ends of the document.

Geometric conversion on the basis of the height information is carried out in the horizontal direction by coordinate position transformation based on height distribution on a horizontal line line ST) passing an arbitrary point P and in the vertical direction by coordinate position transformation based on height information of arbitrary point P (or based on an average of heights of all points on QR).

In this way, information about two heights are used to correct book distortion and thus distortion can be corrected with a higher precision.

Figure 20:
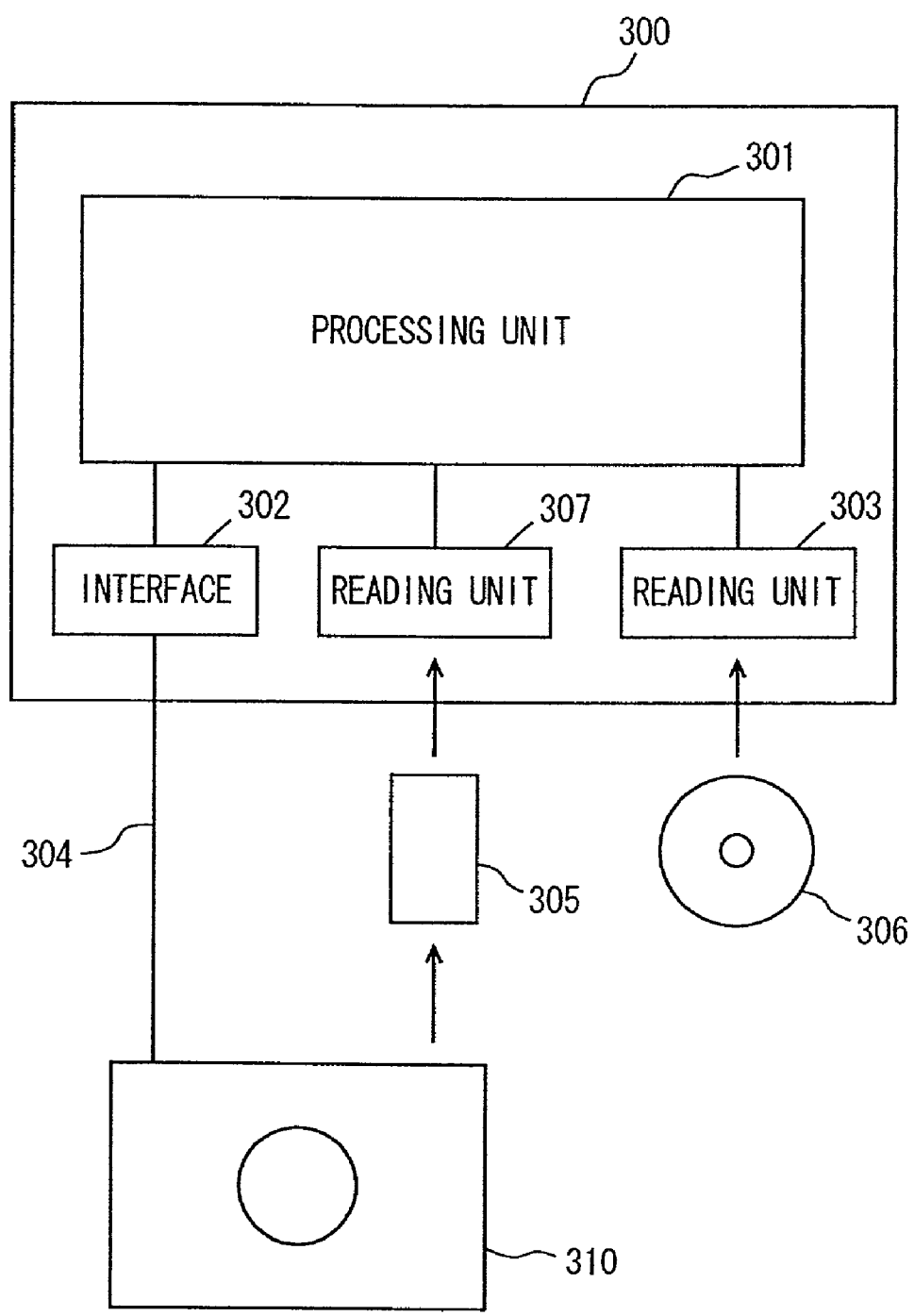
FIG. 20 is a block diagram showing a structure of another embodiment of the present invention.
Figure 22A:
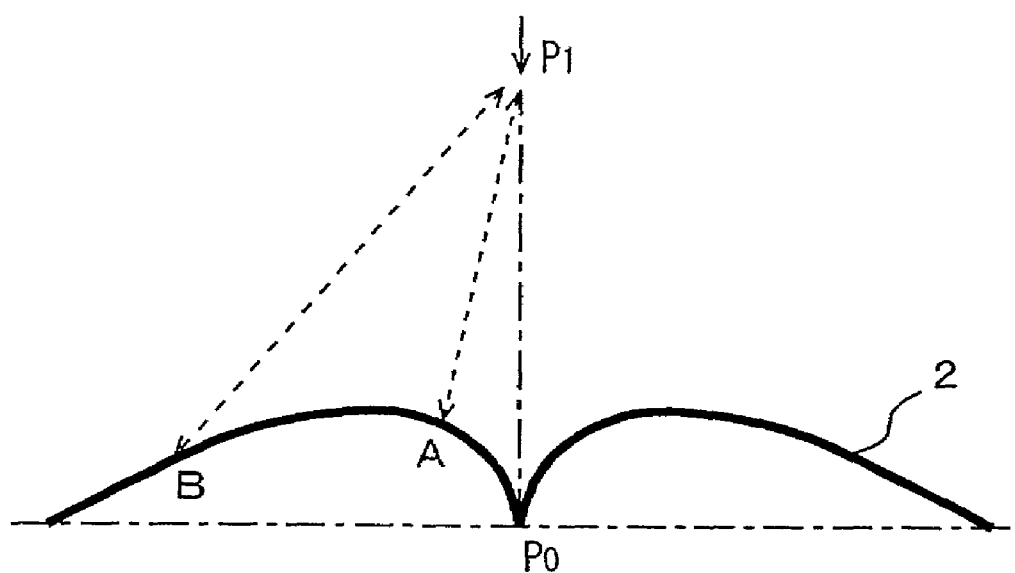
FIGS. 22A and 22B show variation of size in an image of a document depending on horizontal position in the image.
Figure 22B:
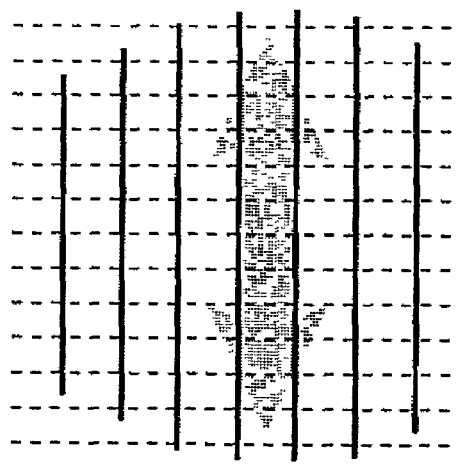

Another embodiment of the present invention is now described. Referring to FIG. 20, the embodiment can be implemented by executing a distortion correction program by a computer. An image taken by a digital camera 310 is supplied to a computer 300 to correct any distortion of the image by computer 300. Computer 300 includes an interface 302 for input of image data from digital camera 310 via a cable 304, a reading unit 307 for input of a distortion correction program via a recording medium 306, a reading unit 303 for reading of recording medium 306 on which the program is recorded, and a processing unit 301 for controlling the entire computer.

The distortion correction program is input to computer 300 via recording medium 306 and computer 300 uses the program to correct distortion of image data from digital camera 310.

The distortion correction program may preliminarily be installed on a hard disk within the computer or recorded on a removable recording medium such as CD-ROM and magnetic tape. In any case, the distortion correction program is recorded on a computer-readable recording medium.

The computer-readable recording medium may be any medium which fixedly holds a program, such as tape media like magnetic tape and cassette tape, disk media like magnetic disk (flexible disk, hard disk and the like) and optical disk (CD-ROM, MO, MD, DVD and the like), card media like IC card (including memory card) and optical card, and semiconductor memories like mask ROM, EPROM, EEPROM and flash ROM.

As heretofore discussed, distortion correction device 200 according to the embodiment of the present invention detects ends of a double page spread document with different heights that is imaged from above, the ends being detected from the resultant image of the document. Then, the detected document ends, an approximate distance between an imaging unit and the document (vertical distance) and a relative distance (horizontal distance) are used to calculate height of the document. The calculated height is used to geometrically convert the original image. In this way, the original image is converted into an image as if the double page spread document which actually has a distorted surface is a plane document. Consequently, the document can easily be recognized and image processing of the document is facilitated.

Moreover, the shape of a document end (edge shape) detected from a document image can be used as a basis for determining a relative distance, height information and the like. Need for illumination device, complex sensor and the like is thus eliminated and consequently the correction device can be reduced in complexity and size.

The medium may temporarily hold the program to allow the program to be downloaded from any network.

Contents stored on the recording medium are not limited to the program and the contents may be data.

According to the embodiment above, a document end is detected to determine the shape of the document end (edge shape) as described in conjunction with FIG. 6 for example. Not only the document end but also line-shaped region on the document such as character string and ruled line may be detected as an edge. Depending on variation of height and direction of the document, the line region or the like also exhibits distortion on the produced image of the document as the document end does. Therefore, based on the shape of the line region or the like, height can be calculated. The detection of such a shape may be done by a similar method to that for detecting inclination of character string, rectangle, line and the like used for calculating a relative position as discussed above.

Regarding document end detection (S305) shown in FIG. 3, description above is applied to detection of a document end by the method as shown in FIGS. 6 and 7. The method is not limited to that as described above and another method may be used to detect a document end by increasing/decreasing the number of pixels to be compared for tracking an edge or still another method may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of correcting an image produced by imaging a surface of an opened book facing upward from above of the surface of said book by a camera having a non-fixed positional relation with said book, comprising the steps of:
    imaging the surface of said opened book to generate an electric signal representing the image of the surface of said book;
    measuring a distance between said camera and the surface of said book;
    extracting, according to said electric signal, an edge image corresponding to an upper or lower end of said book in the image represented by said electric signal;
    determining a position of said camera relative to the surface of said book according to said extracted edge image;
    determining a height distribution of said upper or lower end of the surface of said book according to said measured distance, said extracted edge image of the upper or lower end of said book, and said position of said camera relative to the surface of said book;
    determining a height distribution of an entire image of the surface of said book on the supposition that said book is at the same height in the direction in which said book is opened; and
    converting, according to said determined height distributions, said image signal into a signal representing an image of the surface of said book as a plane surface.

2. A program embodied in a computer readable medium for correcting an image produced by imaging a surface of an opened book facing upward from above of the surface of said book by a camera having a non-fixed positional relation with said book, said program configured to perform the steps of:

imaging the surface of said opened book to generate an electric signal representing the image of the surface of said book;

measuring a distance between said camera and the surface of said book;

extracting, according to said electric signal, an edge image corresponding to an upper or lower end of said book in the image represented by said electric signal;

determining a position of said camera relative to the surface of said book according to said extracted edge image;

determining a height distribution of said upper or lower end of the surface of said book according to said measured distance, said extracted edge image of the upper or lower end of said book, and said position of said camera relative to the surface of said book;

determining a height distribution of an entire image of the surface of said book on the supposition that said book is at the same height in the direction in which said book is opened; and converting, according to said determined height distributions, said image signal into a signal representing an image of the surface of said book as a plane surface.

3. A program embodied in a computer readable medium for correcting an image produced by imaging a surface of an opened book facing upward from above of the surface of said book by a camera having a non-fixed positional relation with said book, said program being executed by a computer provided separately from said camera, and being configured to perform the steps of:

reading an electric signal representing the image of the surface of said book, said electric signal generated by imaging the surface of said opened book;

inputting a distance between said camera and the surface of said book;

extracting, according to said electric signal, an edge image corresponding to an upper or lower end of said book in the image represented by said electric signal;

determining a position of said camera relative to the surface of said book according to said extracted edge image;

determining a height distribution of said upper or lower end of the surface of said book according to said measured distance, said extracted edge image of the upper or lower end of said book, and said position of said camera relative to the surface of said book;

determining a height distribution of an entire image of the surface of said book on the supposition that said book is at the same height in the direction in which said book is opened; and converting, according to said determined height distributions, said image signal into a signal representing an image of the surface of said book as a plane surface.

* * * * *